United States Patent [19]

Cooper et al.

[11] 4,365,038

[45] Dec. 21, 1982

[54] COMPOSITION OF POLYPHENYLENE ETHER RESINS AND EPDM-POLYSTYRENES MODIFIED WITH SILICONE OIL

[75] Inventors: Glenn D. Cooper; Arthur Katchman, both of Delmar, N.Y.

[73] Assignee: General Electric Company, Pittsfield, Mass.

[21] Appl. No.: 220,167

[22] Filed: Dec. 23, 1980

[51] Int. Cl.$^3$ ................................................ C08K 5/54
[52] U.S. Cl. ................................ 260/29.1 SB; 525/68
[58] Field of Search .................... 525/68; 260/29.1 SB

[56] References Cited

U.S. PATENT DOCUMENTS

| | | | |
|---|---|---|---|
| 3,737,479 | 6/1973 | Hoof | 525/68 |
| 3,960,985 | 6/1976 | Cooper | 525/101 |
| 4,102,850 | 7/1978 | Cooper et al. | 525/68 |

*Primary Examiner*—William F. Hamrock
*Assistant Examiner*—Peter F. Kulkosky

*Attorney, Agent, or Firm*—Hedman, Casella, Gibson & Costigan

[57] ABSTRACT

Novel compositions are provided which include a polyphenylene ether resin and EPDM-rubber polystyrene modified or polymerized with silicone oil which is free from unsaturated hydrocarbon groups. Included within the disclosure are methods of preparing and molding such compositions and the molded products obtained therefrom. The compositions provide molded products with substantially better room temperature properties, such as Izod impact and Gardner impact strengths, and surface appearance (gloss), than blends of polyphenylene ether with EPDM-polystyrene with no modifier or modified with an aliphatic mineral oil. Both Izod and Gardner impact strengths at low temperatures are also improved. Also included within the scope of the invention are reinforced and flame-retardant compositions of said polyphenylene ether resin and said EPDM-polystyrene polymerized with silicone oil.

18 Claims, No Drawings

COMPOSITION OF POLYPHENYLENE ETHER RESINS AND EPDM-POLYSTYRENES MODIFIED WITH SILICONE OIL

STATEMENT OF THE INVENTION

This invention relates to improved compositions of a polyphenylene ether and a polystyrene resin modified with an EPDM rubber and polymerized or modified with a silicone oil. The invention also includes methods of making such compositions, molding articles from them and to the molded articles. Reinforced and flame-retardant compositions are also provided by the instant invention.

BACKGROUND OF THE INVENTION

The polyphenylene ether resins are a family of engineering thermoplastics that are well known to the polymer art. These polymers may be made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing on oxygen-containing gas through a reaction solution of a phenol and a metal-amine complex catalyst. Other disclosures relating to processes for preparing polyphenylene ether resins, including graft copolymers of polyphenylene ethers with styrene type compounds are found in Fox, U.S. Pat. No. 3,356,761; Sumitomo, U.K. Pat. No. 1,291,609; Bussink et al, U.S. Pat. No. 3,337,499; Blanchard et al, U.S. Pat. No. 3,219,626; Laakso et al, U.S. Pat. No. 3,342,892; Borman, U.S. Pat. No. 3,344,166; Hori et al, U.S. Pat. No. 3,384,619; Faurote et al. U.S. Pat. No. 3,440,217; and disclosures relating to metal based catalysts which do not include amines, are known from patents such as Wieden et al, U.S. Pat. No. 3,442,885 (copper-amidines); Nakashio et al, U.S. Pat. No. 3,573,257 (metal-alcoholate or -phenolate); Kobayashi et al. U.S. Pat. No. 3,445,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc., are described in Price et al. U.S. Pat. No. 3,382,212. Cizek, U.S. Pat. No. 3,383,435 discloses polyphenylene etherstyrene resin compositions. All of the above-mentioned disclosures are incorporated by reference.

The term "polystyrene resin" includes polymers and copolymers of styrene, alpha methyl styrene, chlorostyrene, and the like.

The term "EPDM" includes rubbery interpolymers of a mixture of mono-olefins and a polyene. Preferred types are those rubbery interpolymers of ethylene, an alpha-olefin, and a polyene. Rubbery interpolymers of ethylene, propylene, and a polyene are especially preferred.

In the prior art, rubber-modified styrene resins have been admixed with polyphenylene ether resins to form compositions that have modified properties. The Cizek patent, U.S. Pat. No. 3,383,435, discloses rubber-modified styrene resin-polyphenylene ether resin compositions wherein the rubber component is of the unsaturated type such as polymers and copolymers of butadiene. The physical properties of these compositions are such that it appears that many of the properties of the styrene resins have been upgraded, while the moldability of the polyphenylene ethers are improved.

Nakashio et al, U.S. Pat. No. 3,658,945 discloses that from 0.5 to 15% by weight of an EPDM-modified styrene resin may be used to upgrade the impact strength of polyphenylene ether resins. In Copper et al, U.S. Pat. No. 3,943,191 it is disclosed that when the highly unsaturated rubber used in compositions of the type disclosed by Cizek, is replaced with EPDM-rubber that has a low degree of residual unsaturation, the thermal oxidative stability and color stability are improved. The EPDM rubber in the Copper et al compositions is comprised substantially of particles in the range of 3-8 microns.

The impact strength of the Copper et al compositions is superior to that of a polyphenylene ether resin alone or that of similar compositions comprised of unmodified polystyrene; however, the impact strength of the Copper et al. compositions is inferior to that of similar compositions comprised of polystyrene modified with polybutadiene rubber, such as a composition known as FG-834, available from Foster-Grant Co. As is disclosed in U.S. Pat. No. 3,981,841, the impact strength of the Copper et al compositions can be improved by incorporating therein impact modifiers such as an emulsion-grafted EPDM polystyrene copolymer. U.S. Pat. No. 4,152,316, incorporated herein by reference, discloses that a composition of a polyphenylene ether resin and an alkenyl aromatic resin modified with an EPDM rubber comprised of particles having a median diameter less than about two microns, preferably about 0.5 to 1.5 microns, is a very useful thermoplastic molding material having good thermal oxidative stability and good room temperature impact strength but inferior low temperature impact strength.

In U.S. Pat. No. 4,102,850 it is disclosed that the addition of a small amount of mineral oil to the polymerizing mixture of styrene and EPDM rubber produces EPDM-modified polystyrene which yields blends with polyphenylene oxide having significantly better low-temperature impact strength than blends made from EPDM-polystyrene made without the mineral oil.

In U.S. Pat. No. 3,737,479 it is disclosed that the addition of silicone oils to polyphenylene oxide or to polyphenylene oxide-polystyrene blends improves Gardner impact strength but does not affect the Izod impact strength.

In U.S. Pat. No. 4,226,761 there is disclosed a composition of a polyphenylene ether resin and an alkenyl aromatic resin that is modified with a polysiloxane in the form of small rubber-like particles. In column 4, lines 44-55 it is stated that some of the R groups, in the formula of the polysiloxane "must be capable of (1) grafting to an alkenyl aromatic resin during polymerization and (2) forming crosslinks so that the final product contains discrete rubbery particles comprised of the polysiloxane and polysiloxane graft polymer, with occlusion of alkenyl aromatic resin in a matrix of an alkenyl aromatic resin such as polystyrene. Therefore, at least some of the R groups, preferably at least one percent, are selected from the group of unsaturated hydrocarbons . . . such as vinyl, allyl, and cyclohexenyl groups."

It has now been found that when small amounts of a silicone oil which is free from unsaturated hydrocarbon groups are added to an EPDM rubber and a styrene monomer reaction mixture, before or during polymerization of the styrene, the resulting product can form blends with a polyphenylene ether resin, which after molding have substantially better room temperature properties (Izod impact, Gardner impact, and surface appearance, gloss) than blends with EPDM-polystyrene made with no modifier or with aliphatic mineral oil. Other properties of the blends, such as ductility, tensile strength and heat distortion temperature (HDT), were not adversely affected. Low temperature impact strength, both Izod and Gardner, was also improved.

It has also been found that the improved molding compositions can be combined with reinforcing fillers of various kinds and flame-retardants.

In U.S. Pat. No. 4,226,761 the blends of polyphenylene ether resin are with graft copolymers of styrene and polysiloxane. Among the differences of the compositions of the patent and the compositions of the present invention, is that, as pointed out in the patent, the polysiloxane in the patent must contain some unsaturated hydrocarbon groups so that the polysiloxane grafts with the styrene and becomes the rubber phase in the polystyrene resin. In the compositions of the present invention the silicone oil is free from any unsaturated hydrocarbon groups, and simply modifies the properties of the polystyrene containing EPDM rubber particles. It may be largely in the rubber phase, but is not chemically bonded to either the polystyrene or the EPDM rubber.

Also, in the patent, the polysiloxanes employed are the high molecular weight polymers (column 4, lines 7 and 8), and in Example 1, therein, the "polysiloxane used was a high molecular weight gum", in contrast to the silicone oil, a fluid, which is the subject of the present invention.

DESCRIPTION OF THE INVENTION

The above mentioned advantages and objects and others will be readily apparent to those skilled in the art by the following compositions.

Preferred types will include theremoplastic compositions which comprise:

(a) from 20 to 80% by weight of a polyphenylene ether resin and (b) from 80 to 20% by weight of a polystyrene resin that is modified with a rubbery interpolymer of a mixture of mono-olefins and a polyene by polymerizing a styrene monomer in the presence of the rubbery interpolymer (EPDM) and a (c) silicone oil free from unsaturated hydrocarbon groups, in an amount effective to enhance the impact resistance of the composition, at both room temperature and low temperature, and, also its surface appearance (gloss). Room temperature means about 73° F., and low temperature means about −40° F.

The EPDM rubbers, that is, rubbery interpolymers comprising mixtures of mono-olefins and a polyene, include those prepared from ethylene, an alpha-olefin, and a polyene. Preferred types comprise 10–90 mole percent of ethylene, 10–90 mole percent of an alpha-olefin containing 3–16 carbon atoms, and 0.1–12 mole percent of a polyene that is a non-conjugated cyclic or open-chain diene having 5–20 carbon atoms. Especially preferred are those alpha-olefins having 3–10 carbon atoms and non-conjugated cyclic or open-chain dienes having 5–10 carbon atoms.

Useful EPDM rubbers include the ethylene-propyleneethylidene norbornene terpolymer, and those described in Ritchie, Vinyl and Allied Polymer, Vol. 1, Page 121 (1968), which is incorporated herein by reference. The preferred EPDM rubbery interpolymers are those comprised of ethylene, propylene, and 5-ethylidene-2-norbornene; of ethylene, propylene and 1,4-hexadiene; and of ethylene, propylene and dicylopentadiene. Preferred modified polystyrene resins will include from about 4 to about 25% by weight of rubbery interpolymer.

The polystyrene resin should have at least 25% of its units derived from styrene monomer of the formula:

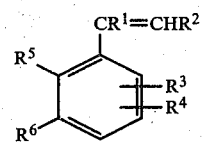

wherein $R^1$ and $R^2$ are selected from the group consisting of hydrogen and lower alkyl groups of from 1 to 6 carbon atoms; $R^3$ and $R^4$ are selected from the group consisting of chloro, bromo, hydrogen, and lower alkyl groups of from 1 to 6 carbon atoms; and $R^5$ and $R^6$ are selected from the group from 1 to 6 carbon atoms and halogen, or $R^5$ and $R^6$ may be concatenated together with hydrocarbyl groups to form a naphthyl group.

Specific examples of styrene monomers include styrene, bromostyrene, chlorostyrene, and α-methylstyrene.

Polyphenylene ether resin blends having an improved low and room temperature impact strength and good surface appearance are obtained when the compositions comprise EPDM rubber modified polystyrene containing a small amount of silicone oil, preferably about 1 to 3% by weight of the silicone oil. The silicone oil is added to the mixture of EPDM rubber and a styrene monomer before or during the polymerization reaction, for example, to a solution of the EPDM rubber in a styrene monomer before or during polymerization of the styrene monomer.

The silicone oils with which the subject invention is concerned are polyorganosiloxanes. These are characterized by a molecular backbone of alternate atoms of silicon and oxygen, with saturated organic groups, for example, saturated hydrocarbon groups, attached to the silicon atoms. The types of organic groups, and the extent of crosslinkage between the molecules will determine whether the polyorganosiloxane will be fluids, elastomers or gums. The fluids or silicone oil, which are free from unsaturated hydrocarbon groups are employed in the subject invention.

Any of the usual well-known liquid polyorganosiloxanes free from unsaturated hydrocarbon groups may be used in connection with this invention. Such polyorganosiloxanes may be prepared, for example, by the hydrolysis of hydrolyzable aliphatic or aromatic-substituted silanes, such as dialiphatic dihalosilanes, for example dimethyldichlorosilane, followed by complete or partial condensation of the hydrolysis product. They may also be prepared, for example, by hydrolyzing mixtures of hydrolyzable diorgano-substituted silanes either among themselves or with hydrolyzable silanes containing for example, three organic radicals substituted on the silicon atom, for instance, trimethylchlorosilane.

A further method for preparing the organo-substituted polysiloxanes comprises hydrolyzing a diorgano-substituted dihalosilane, isolating the hydrolysis product and effecting reaction between the hydrolyzed product and e.g., hexamethyl disiloxane in the presence of sulfuric acid. More specific directions for the hydrolysis of hydrolyzable organo-substituted silanes to form organo-substituted polysiloxanes may be found, for example, in patents and in the literature now available in the art.

By the term "hydrolyzable organo-substituted silanes" it is intended to mean derivatives of $SiH_4$ which contain hydrolyzable groups, or radicals, for example, halogens, amino groups, alkoxy, aryloxy, acyloxy, radicals, and the like, in addition to the organic groups substituted directly on the silicon atom that are joined to the silicon through carbonsilicon linkages. Examples of such organic radicals are aliphatic radicals including alkyl radicals, for example, methyl, ethyl, propyl, isopropyl, butyl, and the like, alicyclic radicals, for example, cyclopentyl, cyclohexyl, and the like; aryl radicals, for example, phenyl, diphenyl, naphthyl, anthracyl, and the like, aralkyl radicals, for example, benzyl, phenethyl, and the like; alkaryl radicals, for example, tolyl, xylyl, and the like; heterocyclic radicals, as well as hydrolyzable silanes; containing two different organic radicals, for example, methyl and phenyl radicals, and the like, attached to the silicon atom. If desired, the above-mentioned radicals may also contain substituents substituted thereon, for instance, halogens, e.g., di-, tri-, and tetra-chlorophenylchloro-silanes, for example, trichlorophenyltrichlorosilane, tetrachlorophenyltrichlorosilane, and the like. The monochlorosilanes, of course act as chain stoppers.

Hydrolysis of the above silanes or mixtures of silanes results in the formation of silanols, i.e., organo-substituted silanes containing hydroxy groups substituted directly on the silicon, which hydroxy groups almost immediately condense intermolecularly (intercondense) splitting out water to give the siloxane linkages mentioned previously. Such intercondensations are accelerated by acidic materials, for example, sulfuric acid, hydrochloric acid, ferric chloride, and the like, as well as my basic materials, for example, sodium hydroxide, potassium hydroxide, and the like. As a result of the hydrolysis and condensation, organo-substituted polysiloxanes may be produced which are partially or completely condensed and which may have on an average up to as high as three organic radicals substituted per silicon atom, but preferably from 1.98 to 2.25 organic groups per silicon atom.

Other directions for preparing the organopolysiloxane compositions employed in the practice of the present invention are disclosed and claimed in U.S. Pat. Nos. 2,469,888 and 2,469,890, granted to the present assignee on May 10, 1949.

A preferred family of polyorganosiloxanes free from unsaturated hydrocarbons, for use in this invention comprises those of the formula:

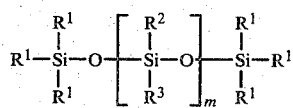

wherein $R^1$ is alkyl, haloalkyl aryl, arakly, alkaryl, alkoxy, aryloxy and halogenated derivatives of the aforesaid aryl, aralkyl, alkaryl, alkoxy or aryloxy groups. $R^2$ and $R^3$ are (lower) alkyl or phenyl, and m is an integer of such a value that the polysiloxane is a fluid at ambient temperatures.

The preferred family will thus be limited to polyorganosiloxanes which are fluid, in contrast to being rubber or resinous solids, at ambient temperatures, e.g., about 25° C.

The (lower) alkyl groups in the polyorganosiloxanes will contain from 1 to 6 carbon atoms, straight chain and branched. Special mention is made of a preferred class of polyorganosiloxanes which includes polymethylphenyl-siloxane, polydiphenylsiloxane and copolymers such as methylphenyl and dimethylpolysiloxane copolymer.

Preferred silicone oils are SF96 (50) a dimethyl polysiloxane with a viscosity of 50 centistokes and SF96 (500) a similar oil with a viscosity of 500 centistokes, both manufactured commercially by the General Electric Company.

The polystyrene resins include, by way of example, homopolymers such as homopolystyrene and monochloropolystyrene, and styrene-containing copolymers, such as styrene-chlorostyrene copolymers, styrene-bromostyrene copolymers, and α-alkyl styrene copolymers.

The preferred polyphenylene ethers are of the formula:

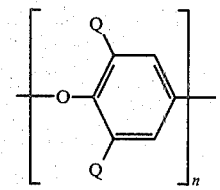

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

Examples of polyphenylene ethers corresponding to the above formula can be found in the above-references patents of Hay and Stamatoff. Especially preferred is poly(2,6-dimethyl-1,4-phenylene) ether. The intrinsic viscosity of the polyphenylene ethers can range from about 0.40 to 0.65 dl./g measured in $CHCl_3$ at 30° C.

The polystyrene resin modified with an EPDM rubber may be prepared by dissolving the rubbery interpolymer in the styrene monomer and polymerizing the mixture, preferably in the presence of a free-radical initiator, until 90-100% by weight of the styrene monomer has reacted to form said EPDM modified polystyrene resin.

The compositions of the invention can also include other ingredients, such as flame-retardants, extenders, processing aids, pigments, stabilizers, fillers such as mineral fillers and glass flakes and fibers, and the like. In particular, reinforcing fillers, in amounts sufficient to impart reinforcement, can be used, e.g., aluminum, iron or nickel, and the like, and non-metals, e.g., carbon filaments, silicates, such as acicular calcium silicate, asbestos, titanium dioxide, potassium titanate and titanate whiskers, glass flakes and fibers, and the like. It is to be understood that, unless the filler adds to the strength and stiffness of the composition, it is only a filler and not a reinforcing filler as contemplated herein. In particular, the reinforcing fillers increase the flexural strength, the flexural modulus, the tensile strength and the heat distortion temperature.

Although it is only necessary to have at least a reinforcing amount of the reinforcement present, in general, the combination of components (a) and (b) will comprise from about 20 to about 95 parts by weight and the filler will comprise from about 80 to about 5 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing by flame blowing, or by mechanical pulling. The preferred filaments for plastics reinforcement are made by mechanical pulling. The filament diameters range from about 0.000112 to 0.00075 inch, but this is not critical to the present invention.

In general, the best properties will be obtained if the sized filamentous glass reinforcement comprises from about 5 to about 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70–80% by weight of glass. These concentrates can then be custom blended with resin compositions that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about $\frac{1}{8}$ inch to about 1 inch long, preferably less than 1 inch long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 inch and 0.125 inch.

Because it has been found that certain commonly used flammable sizings on the glass, e.g., dextrinized starch or synthetic polymers, contribute flammability often in greater proportion than expected from the amount present, it is preferred to use lighly sized or unsized glass reinforcements in those compositions of the present invention which are flame-retardant. Sizings, if present, can readily be removed by heat cleaning or other techniques well known to those skilled in the art.

It is preferred feature of this invention also to provide flame-retardant thermoplastic compositions, as defined above, by modifying the composition to include a flame-retardant additive in a minor proportion but in an amount at least sufficient to render the composition non-burning or self-extinguishing.

A preferred feature of the invention is a flame-retardant composition as above defined, which also includes a halogenated organic compound, a halogenated organic compound in admixture with an antimony compound, elemental phosphorus, a phosphorus compound, compounds containing phosphorus-nitrogen bonds, or a mixture of two or more of the foregoing.

When used herein, the terms "non-burning", "self-extinguishing" and "non-dripping" are used to describe compositions which meet the standards of ASTM test method D-635 and Underwriters' Laboratories Bulletin No. 94. Another recognized procedure to determine flame resistance of resinous compositions is the Oxygen Index Test or LOI (Limiting Oxygen Index). This test is a direct measure of a product's combustibility based on the oxygen content of the combustion atmosphere. Appropriate specimens are placed in a combustion chimney, and the oxygen is reduced stepwise until the material no longer supports a flame. The LOI is defined as the percent oxygen times 100 divided by the sum of the percentages of nitrogen and oxygen in the gas used to burn the material under test. Further details of the Oxygen Index Test are found in ASTM test Method D-2863. The compositions of this invention which contain flame-retardant additives in the specified amounts have a substantially higher oxygen index and thus are much less combustible than the controls.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus, and nitrogen. It is preferred that the flame-retardant additive comprise a halogenated organic compound (brominated or chlorinated); a halogen-containing organic compound in admixture with antimony oxide; elemental phosphorus or a phosphorus compound; a halogen-containing compound in admixture with a phosphorus compound or compounds containing phosphorus-nitrogen bonds; or a mixture of two or more of the foregoing.

The amount of flame-retardant additive used is not critical to the invention, so long as it is present in a minor proportion based on the polyphenylene ether modified alkenyl aromatic polymer composition—major proportions will detract from physical properties—but at least sufficient to render the composition non-burning or self-extinguishing. Those skilled in the art are well aware that the amount will vary with the nature of the polymers in the composition and with the efficiency of the additive. In general, however, the amount of additive will be from about 0.5 to 50 parts by weight per hundred parts of components (a) plus (b). A preferred range will be from about 1 to 25 parts, and an especially preferred range will be from about 3 to 15 parts of additive per 100 parts of (a) plus (b). Smaller amounts of compounds highly concentrated in the elements responsible for flame-retardance will be sufficient, e.g., elemental red phosphorus will be preferred at about 0.5 to 10 parts by weight per hundred parts of (a) plus (b), while phosphorus in the form of triphenyl phosphate, will be used at about 3 to 25 parts of phosphate per part of (a) plus (b) and so forth. Halogenated aromatics will be used at about 2 to 20 parts and synergists, e.g., antimony oxide, will be used at about 1 to 10 parts by weight per 100 parts of components (a) plus (b).

Among the useful halogen-containing compounds are those of the formula:

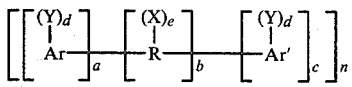

wherein n is 1 to 10 and R is an alkylene, alkylidene, or cycloaliphatic linkage, e.g., methylene, ethylene, propylene, isopropylene, isopropylidene, butylene, isobutylene, amylene, cyclopentylidene, and the like, or a linkage selected from the group consisting of ether; carbonyl; amine; a sulfur-containing linkage, e.g., sulfide, sulfoxide, or sulfone; carbonate, a phosphorus-containing linkage; and the like. R can also consist of two or more alkylene or alkylidene linkages connected by such groups as aromatic, amino, ether, ester, carbonyl, sulfide, sulfoxide, sulfone, a phosphorus-containing linkage, and the like. R can be dihydric phenol, e.g., bisphenol-A, carbonate linkage. Other groups which are represented by R will occur to those skilled in the art. Compounds of this type are disclosed in U.S. Pat. No. 3,647,747 and U.S. Pat. No. 3,334,154, both of which are incorporated by reference.

Ar and Ar' are mono- or polycarboxylic aromatic groups such as phenylene, biphenylene, terphenylene, naphthlene, and the like. Ar and Ar' may be the same or different.

X is a monovalent hydrocarbon group exemplified by the following: alkyl groups, such as methyl, ethyl, propyl, isopropyl, butyl, decyl, and the like; aryl groups, such as phenyl, naphthyl, biphenyl, xylyl, tolyl, and the like, aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used, they may be alike or different.

Y is a substituent selected from the group consisting of organic, inorganic, and organometallic radicals. The substituents represented by Y include (1) halogen, e.g., chlorine, bromine, iodine, or fluorine, (2) ether groups of the general formula OE, wherein E is a monovalent hydrocarbon radical similar to X, (3) monovalent hydrocarbon groups of the type represented by R, and (4) other substituents, e.g., nitro, cyano, etc., said substituents being essentially inert provided there be at least one and preferably two halogen atoms per aryl, e.g., phenyl, nucleus.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0, and when b is 0, either a or c but not both, may be 0. Where b is 0, the aromatic groups are joined by a direct carbon-carbon bond.

The hydroxyl and Y substituents on the aromatic groups, Ar and Ar' can be varied in the ortho, meta, or para positions on the aromatic rings, and the groups can be in any possible geometric relationship with respect to one another.

Included within the scope of the above formula are di-aromatics of which the following are representative:
2,2-bis(3,5-dichlorophenyl)propane
bis(2,6-dibromophenyl)methane
1,1-bis-(4-iodophenyl)ethane
1,2-bis-(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromphenyl)ethane
2,3-bis-(4,6-dichloronaphthyl)propane
2,2-bis-(2,6-dichlorophenyl)pentane
2,2-bis-(3,5-dichloromophenyl)hexane
bis-(4-chlorophenyl)phenylmethane
bis-(3,5-dichlorophenyl)cyclohexylmethane
bis-(3-nitro-4-bromophenyl)methane
bis-(4-hydroxy-2,6-dichloro-3-methoxyphenyl)methane
2,2-bis-(3,5-dichlor-4-hydroxyphenyl)propane
2,2-bis-(3-bromo-4-hydroxyphenyl)propane The preparation of these and other applicable biphenyls are known in the art. In the above examples sulfide, sulfoxy, and the like may be substituted in place of the divalent aliphatic group.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl, and halogenated diphenyl ethers containing from 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl, or a compound comprising two phenyl radicals separated by a divalent alkylene group and having at least two chlorine or bromine atoms per phenyl nucleus, or mixtures of at least two of the foregoing.

Especially preferred are hexabromobenzene and chlorinated biphenyls or terphenyls, alone, or mixed with antimony oxide.

In general, the preferred phosphate compounds are selected from the group of elemental phosphorus and organic phosphonic acids, phosphonates, phosphinates, phosphonites, phosphinites, phosphine oxides, phosphines, phosphites, and phosphates. Illustrative is triphenyl phosphine oxide. These can be used alone or mixed with hexabromobenzene or a chlorinated biphenyl, and optionally, antimony oxide.

Typical of the preferred phosphorus compounds to be employed in this invention would be those having the general formula:

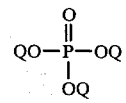

and nitrogen analogs thereof where each Q represents the same or different radicals including hydrocarbon radicals such as alkyl, cycloalkyl, aryl, alkyl substituted aryl, and aryl substituted alkyl; halogen; hydrogen; and combinations thereof provided that at least one of said Q's is aryl. Typical examples of suitable phosphates include, phenylbisdodecyl phosphate, phenylbisneopentyl phosphate, phenylethylene hydrogen phosphate, phenylbis-(3,5,5'-trimethylhexyl phosphate), ethyldiphenyl phosphate, 2-ethylhexyl di(p-tolyl)phosphate, diphenyl hydrogen phosphate, bis(2-ethylhexyl) p-tolylphosphate, tritolyl phosphate, bis-(2-ethylhexyl)-phenyl phosphate, tri-(nonylphenyl) phosphate, phenylmethyl hydrogen phosphate, di(dodecyl)p-tolyl) phosphate, tricresyl phosphate, triphenyl phosphate, halogenated triphenyl phosphate, dibutylphenyl phosphate, 2-chloroethyldiphenyl phosphate, p-tolyl bis (2,5,5'-trimethylhexyl)phosphate, 2-ethylhexyldiphenyl phosphate, diphenyl hydrogen phosphate, and the like. The preferred phosphates are those where each Q is aryl. The most preferred phosphate is triphenyl phosphate. It is also preferred to use triphenyl phosphate in combination with hexabromobenzene and, optionally, antimony oxide. Especially preferred is a composition comprised of mixed triaryl phosphates, with one or more isopropyl groups on some or all of the aryl rings, such as Kronitex 50 supplied by Food Machinery Corporation.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl)phosphine oxide, or tetrakis (hydroxymethyl) phosphonium chloride. These flame-retardant additives are commercially available.

The compositions of the invention may be formed by conventional techniques, that is, by first dry mixing the components to form a premix, and then passing the premix through an extruder at an elevated temperature, e.g., 425° to 640° F.

By way of illustration, glass roving (a bundle of strands of filaments) is chopped into small pieces, e.g., ⅛ inch to 1 inch in length, and preferably less than 1 inch in length and put into an extrusion compounder with (a) the polyphenylene ether resin, (b) modified EPDM-polystyrene resin modified with (c) silicone oil and (d) the flame-retardant additive(s) to produce molding pellets. The fibers are shortened and predispersed in the process, coming out at less than 1/16 inch long. In another procedure, glass filaments are ground or milled to short lengths, are mixed with the polyphenylene ether resin, the modified EPDM-polystyrene resin modified with silicone oil and optionally, flame-retardant additive, by dry blending, and then are either fluxed on a mill and ground, or are extruded and chopped.

In addition, compounding should be carried out to insure that the residence time in the machine is short; that the temperature is carefully controlled; that the frictional heat is utilized; and that an intimate mixture between the resins and the additives is obtained.

DESCRIPTION OF THE PREFERRED EMBODIMENTS

The following examples are set forth as further illustration of the invention and are not to be construed as limiting the invention thereto.

EXAMPLE I (Preparation of EPDM-Polystyrene)

100 grams of EPCAR 387 (an EPDM rubber manufactured by B. F. Goodrich Chemical Co.) were cut in small pieces and dissolved in 900 grams of styrene. One gram of tert-butyl peracetate was added and the solution was transferred to a one gallon reactor and heated at 100° C. for three hours, with vigorous stirring. The mixture was suspended in 1,500 ml. of water containing 4.0 grams of polyvinyl alcohol and 3.0 grams of gelatin. 8.0 grams of di-tert-butyl peroxide were added and the mixture was heated for one hour at 100° C., for two hours, at 120° C., for one hour at 140° C. and finally for two hours at 155° C. The mixture was allowed to cool, and the EPDM-modified polystyrene, which was obtained in the form of beads was filtered off, washed thoroughly with hot water, and dried in a vacuum oven.

EXAMPLES II-IV

The procedure of Example I was followed in separate runs. To one of the EPDM rubber-polystyrene reaction mixtures 20 grams of Kaydol, a white mineral oil manufactured by Witco Chemical Company were added before polymerization. The Kaydol had a Saybolt viscosity of 350° centistokes at 100° F. and a pour point of 0°. In a second run 20 grams of SF 96 (50) silicone oil (a dimethyl polysiloxane with a viscosity of 50 centistokes, manufactured by the General Electric Company) were added. In a third run 20 grams of SF 96 (500), a similar dimethyl polysiloxane with a viscosity of 500 centistokes, were added. The fourth run was carried out as in Example I, with no additive of either the mineral oil or the silicone oil.

Each of the EPDM-polystyrenes was blended with a polyphenyleneoxide as follows:

50 parts of poly (2,6-dimethyl,-1,4-phenylene) ether having an intrinsic viscosity of about 0.47 dl./g. measured in CHCl$_3$ at a temperature of 30° C., 50 parts of each of the EPDM-polystyrenes, 3 parts of triphenyl phosphate, 1 part of diphenyl decyl phosphite, 1.5 parts of low molecular weight polyethylene, 0.15 part of zinc sulfide, and 0.15 parts of zinc oxide were mixed together and extruded in a 28 mm. twin-screw extruder with a barrel temperature of 570° F. The extruded pellets were molded into standard ASTM test pieces at 520° F. in a screw injection molding machine.

The properties of the blends are summarized in the following table:

| Example | Additive | Elongation (%) | Tensile Yield (psi) | Gloss No. | HDT (°F.) | Izod Impact (ft. lbs/in. notch) 73° F. | Izod Impact (ft. lbs/in. notch) −40° F. | Gardner Impact (in. lbs.) |
|---|---|---|---|---|---|---|---|---|
| 1 | None | 72 | 8,600 | 56 | 255 | 3.8 | 1.1 | 150 |
| 2 | 2% Mineral oil | 66 | 9,400 | 57 | 254 | 4.3 | 1.2 | 200 |
| 3 | 2% Silicone (50 cs) | 72 | 9,800 | 60 | 258 | 5.4 | 1.5 | 250 |
| 4 | 2% silicone (500 cs) | 81 | 9,200 | 62 | 263 | 5.4 | 1.6 | 275 |

It is thus seen that the blends with silicone oil have a greater Izod and Gardner impact strength at both room and low temperature and an improved surface appearance (gloss).

The above mentioned patents and/or publications are incorporated herein by reference. Obviously, other modifications and variations of the present invention are possible, in the light of the above teachings. It is therefore, to be understood that changes may be made in the particular embodiments of the invention described which are within the full intended scope of the invention as defined by the appended claims.

It is claimed:

1. A thermoplastic molding composition which comprises:
   (a) from about 20 to about 80% by weight of a polyphenylene ether resin;
   (b) from about 80 to about 20% by weight of a polystyrene resin-modified with a rubbery interpolymer of a mixture of mono-olefins and a polyene by polymerizing a styrene monomer in the presence of the rubbery interpolymer, and
   (c) a silicone oil, free from unsaturated hydrocarbon groups, in an amount effective to enhance the impact resistance of the composition, at both room temperature and low temperature, and also its surface appearance, wherein said silicone oil is added to a solution of the rubbery interpolymer in the styrene monomer before polymerization of the styrene.

2. The composition of claim 1 wherein the polystyrene is modified with a rubbery interpolymer of ethylene, an alpha-olefin and a polyene.

3. The composition of claim 2, wherein the alpha-olefin is propylene.

4. The molding composition of claim 1 wherein the polyphenylene ether resin is selected from compounds of the formula:

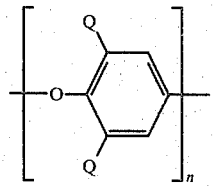

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halo-hydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

5. The composition of claim 1 wherein the polystyrene resin is prepared from a monomer selected from the group consisting of styrene, α-methylstyrene, bromostyrene and chlorostyrene.

6. The molding composition of claim 1 wherein said composition includes a reinforcing amount of an inorganic reinforcing filler.

7. The molding composition of claim 5 wherein said composition includes 5–80% by weight of fibrous glass filaments, based on the total weight of the composition.

8. The molding composition of claim 1 wherein said composition includes a flame-retardant amount of a flame-retardant additive.

9. The molding composition of claim 8 wherein said flame retardant is a halogenated organic compound, a halogenated organic compound in admixture with an antimony compound, elemental phosphorus, a phosphorus compound, compounds containing phosphorus-nitrogen bonds, or a mixture of two or more of the foregoing.

10. The composition of claim 1 wherein the modified polystyrene resin contains from about 1 to 3% of silicone oil.

11. The composition of claim 10, wherein the silicone oil is

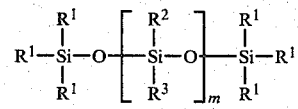

wherein $R^1$ is alkyl, haloalkyl, aryl, aralkyl, alkaryl, alkoxy, aryloxy and halogenated derivatives of the aforesaid aryl, aralkyl, alkaryl, alkoxy or aryloxy groups, $R^2$ and $R^3$ are (lower) alkyl or phenyl and m is an integer of such a value that the polysiloxane is a fluid at ambient temperatures.

12. The composition of claim 11, wherein the polyorganosiloxane is a dimethyl polysiloxane with a viscosity of 50 centistokes.

13. The composition of claim 11, wherein the polyorganosiloxane is a dimethyl polysiloxane with a viscosity of 500 centistokes.

14. The composition of claim 1 wherein the polyphenylene oxide is poly(2,6-dimethyl-1,4-phenylene) oxide.

15. A composition having high impact strength at both room and low temperatures and an improved surface appearace obtained by molding the composition described in claim 1.

16. A molded composition having high impact strength at both room and low temperature and an improved surface appearance obtained by molding the composition described in claim 10.

17. A process for preparing the composition described in claim 1 which comprises polymerizing components (b) and (c) thereof and blending the resulting product with component (a).

18. A process according to claim 17 wherein the blended product is molded into any desired shape.

* * * * *